US005809000A

United States Patent [19]

Choi

[11] Patent Number: 5,809,000

[45] Date of Patent: Sep. 15, 1998

[54] OPTICAL PICKUP SYSTEM FOR READING OPTICAL DISKS OF DIFFERENT THICKNESSES

[75] Inventor: Yang-Oh Choi, Seoul, Rep. of Korea

[73] Assignee: Daewoo Electronics, Co., Ltd., Seoul, Rep. of Korea

[21] Appl. No.: 866,233

[22] Filed: May 30, 1997

[30] Foreign Application Priority Data

May 31, 1996 [KR] Rep. of Korea .................. 1996-19114
Jun. 27, 1996 [KR] Rep. of Korea .................. 1996-24355

[51] Int. Cl.[6] .................................................. G11B 7/00

[52] U.S. Cl. .................. 369/112; 369/44.23; 369/44.24; 369/94; 369/109; 369/118

[58] Field of Search .................................... 369/112, 109, 369/44.23, 44.24, 94, 118

[56] References Cited

U.S. PATENT DOCUMENTS 5,568,462 10/1996 Park ........................................ 369/112
5,665,957 9/1997 Lee et al. ................................ 369/118
5,696,750 12/1997 Katayama ............................... 369/112

*Primary Examiner*—Tod R. Swann
*Assistant Examiner*—Kim-Kwok Chu
*Attorney, Agent, or Firm*—Pennie & Edmonds LLP

[57] ABSTRACT

An optical pickup system for reading information stored on a first or a second optical disk, each of the optical disks having a different thickness and selectively loaded on a disk tray, is provided with a light source for generating a first or a second light beam depending on the optical disk selectively loaded, each of the first and the second light beams having a different wavelength from each other, $\lambda_1$, $\lambda_2$, a knife edge, an optical device including a first and a second parts, an objective lens and a detector. In the above system, if one of the optical disks is selected to be loaded on a disk tray, the light source selects a light beam from the first and the second light beams based on the thickness of the selected optical disk. The knife edge reflects a portion of the selected light beam to the corresponding part of the optical device and the objective lens focuses the portion of the selected light beam transmitted through the selected optical disk, wherein the corresponding part of the optical device is capable of transmitting the selected light beam. The light beam reflected from the selected optical disk is converged on the detector and the corresponding part of the optical device, thereby allowing the optical pickup system to read the information off the selectively loaded optical disk.

20 Claims, 6 Drawing Sheets

200

256

252

240

234

232

232

230

270

210

222

220

260

100
118
119
116
160
121
115
113
134
112
120
122
132
133
127
124
126
+
128

200
256
252
240
232
234
232
230
270
210
222
220
260

254
252
240
242
244
242
234
230
232
232

258
256
240
242
244
242
234
230
232
232

OPTICAL PICKUP SYSTEM FOR READING OPTICAL DISKS OF DIFFERENT THICKNESSES

FIELD OF THE INVENTION

The present invention relates to an optical pickup system; and, more particularly, to an improved optical pickup system capable of reading optical disks of different thicknesses.

DESCRIPTION OF THE PRIOR ART

In FIG. 1, there is shown an optical pickup system 100 capable of reproducing a signal from an information storage area on a conventional optical information recording disk, disclosed in commonly owned, U.S. Pat. No. 5,568,462, entitled "KNIFE EDGE METHOD FOR USE IN DETECTING A FOCUSING ERROR IN AN OPTICAL PICKUP SYSTEM", which is incorporated herein by reference. The optical pickup system 100 comprises a light source 112, an objective lens 116, an optical disk 119, a knife edge 120 having a reflection surface 134, a differential amplifier 128 and an optical detector 122 provided with a reception surface 127. In the system 100, a light beam 113 emitted from the light source 112 impinges onto the knife edge 120 and is partially reflected by a reflection surface 134 thereof. The reflected light beam 115 from the reflection surface 134 is transmitted through the objective lens 116 onto a recording surface 118 of the optical disk 119 as a focused light beam. The focused light beam is then converged by the objective lens 116 and then passing by the knife edge 120. The focused light beam passed by the knife edge 120 impinges on the reception surface 127 of the optical detector, the reception surface 127 including a first and a second photoelectric cells 132, 133. Outputs from the first and the second photoelectric cells 132, 133 are sent to a pair of input ports 124, 126 on the differential amplifier 128 which generates a focusing error signal by comparing the outputs from the first and the second photoelectric cells of the optical detector.

Recently, a thin optical disk having the thickness of, e.g., 0.6 mm, is preferably used for realizing a high density optical storage. However, there are a number of problems associated with the above-described optical pickup system 100. First of all, if an optical pickup system 100 for reading the conventional 1.2 mm optical disk 119 is used to read a thin 0.6 mm optical disk, the spherical aberration caused by the disk thickness differential must be corrected.

SUMMARY OF THE INVENTION

It is, therefore, a primary object of the present invention to provide an improved optical pickup system capable of reading optical disks having different thicknesses from each other.

In accordance with the present invention, there is provided an optical pickup system for reading information stored on a first or a second optical disk selectively loaded on a disk tray, each of the optical disks having a recording surface and a different thickness, said system comprising: a light source for selectively generating a first or a second light beam depending on the optical disk selectively loaded, each of the light beams having a different wavelength; a knife edge for reflecting a portion of the selectively generated light beam to the recording surface of the selectively loaded optical disk; an optical device for transmitting a fraction of the selected light beam from the knife edge; and objective lens for focusing the transmitted light beam on the recording surface of the corresponding optical disk, thereby allowing the optical pickup system to read the information off the recording surface.

BRIEF DESCRIPTION OF THE DRAWINGS

The present invention together with the above and other objects and advantages will become apparent from the following description of preferred embodiments given in conjunction with the accompanying drawings, wherein.

DETAILED DESCRIPTION OF THE PREFERRED EMBODIMENTS

There are illustrated in FIGS. 2 to 6 various views of the inventive optical pickup system in accordance with a preferred embodiment of the present invention.

Figure 1:
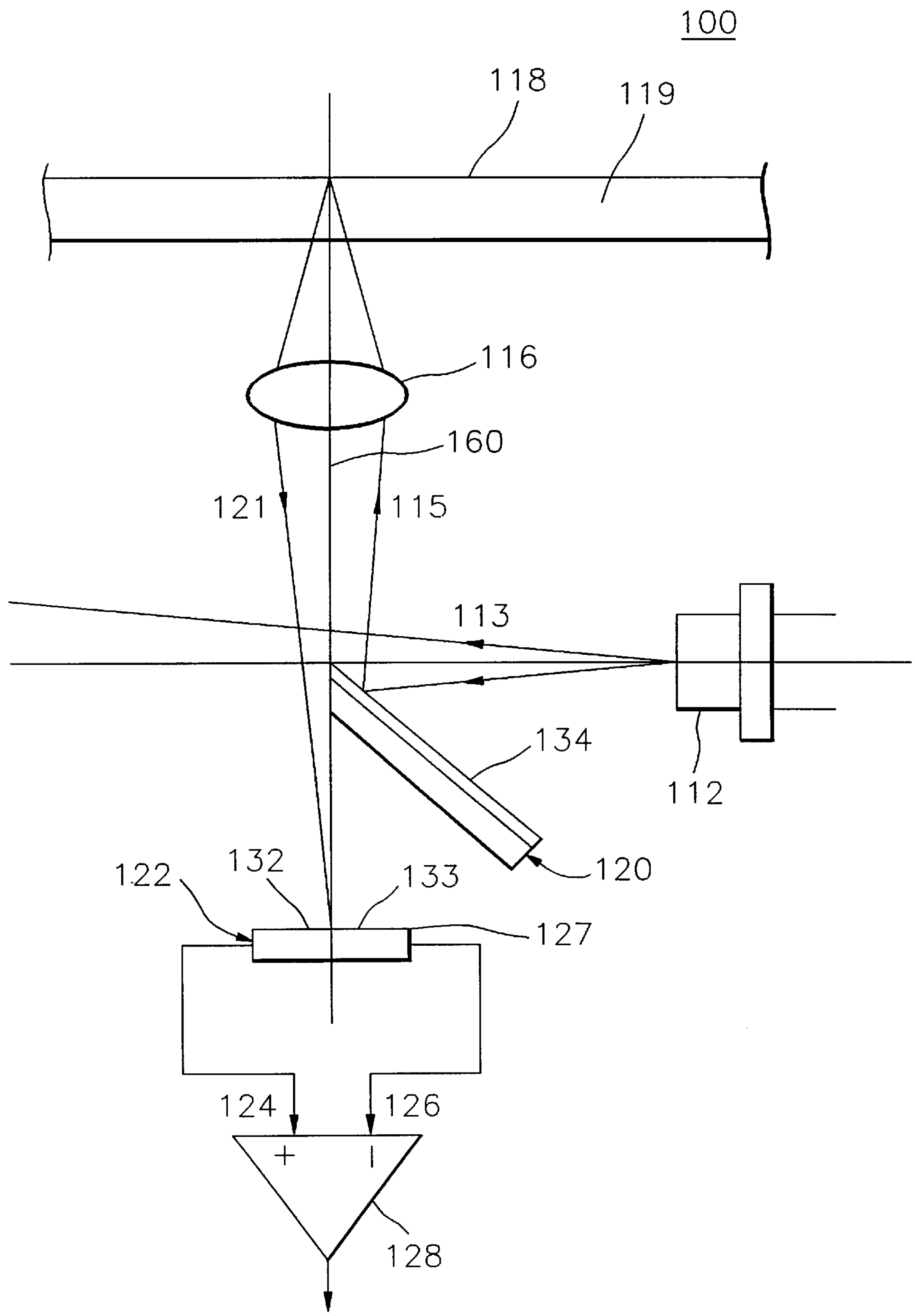
FIG. 1 represents a schematic side view of a prior art optical pickup system.
Figure 2:
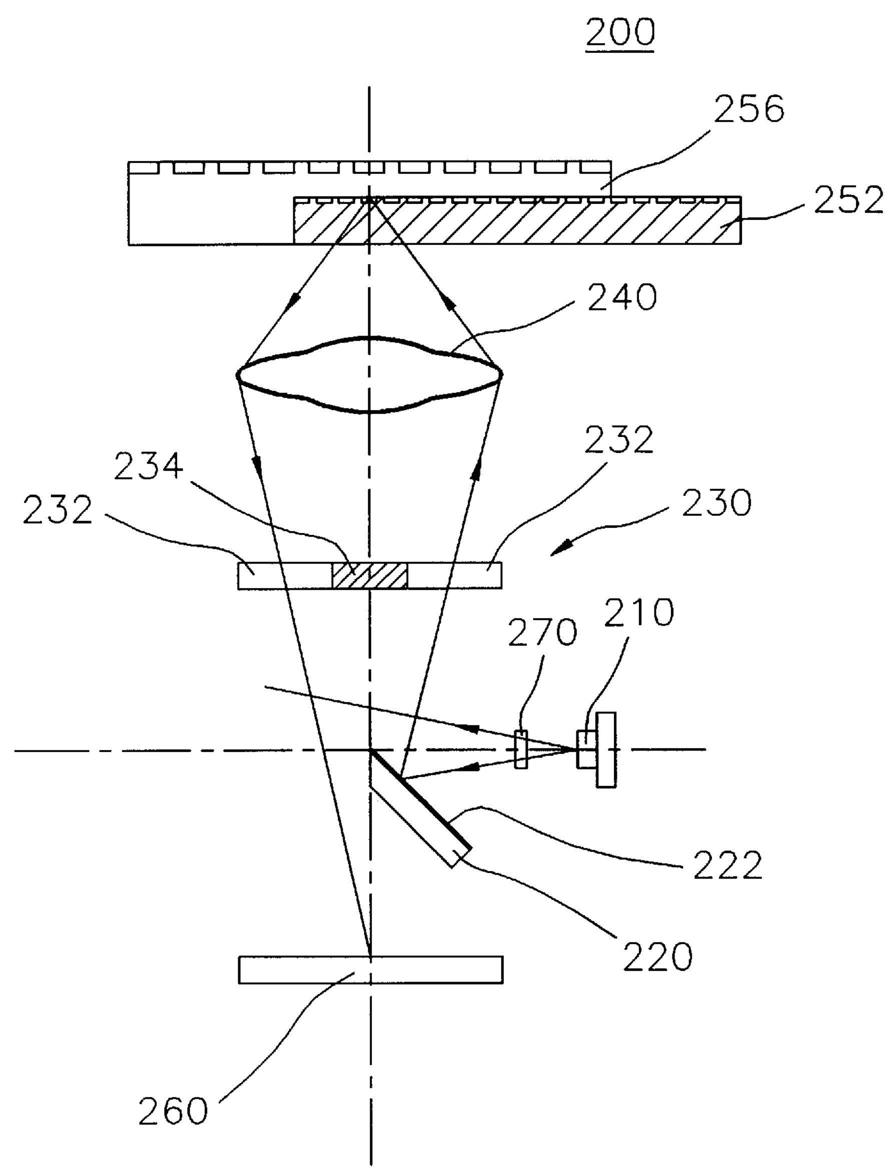
FIG. 2 illustrates a schematic side view of an optical pickup system in accordance with a preferred embodiment of the present invention.

As shown in FIG. 2, the optical pickup system 200 in accordance with the present invention comprises a light source 210, e.g., a wavelength-tunable semiconductor laser, for generating a first or a second light beam, selectively, each of the first and the second light beams having a different wavelength from each other, a first wavelength $\lambda_1$, and a second wavelength $\lambda_2$, a diffraction grating 270, a knife edge 220 provided with a reflection surface 222, an optical device 230 including a first and a second parts 232, 234, an objective lens 240 and a detector 260 provided with a plurality of reception surfaces 262, 264.

In the system 200, if one of the optical disks 252, 256 is selected to be loaded on a disk tray, the light source 210 selects a light beam from either one of the first and the second light beams based on the thickness of the selected optical disk. The selected light beam emitted from the light source 210 impinges onto the diffraction grating 270 for obtaining a light beam of three diffractive components, 0th and +/−1st. The light beam of the three diffractive components is divided into two light beams, each of them having the three components, by the reflection surface 222 of the knife edge 220. The reflection surface 222 of the knife edge 220 is arranged in such a way that it is inclined at a predetermined angle with respect to an optical axis formed by a central point of the detector 260 and the focal point of the light beam transmitted through the objective lens on the recording surface of the selected optical disk. It is preferable that the predetermined angle be 45 degrees. The detector 260 is placed opposite the selected optical disk with respect to the objective lens 240, wherein each of the reception surfaces 262, 264 being capable of measuring a light beam intensity and generating a corresponding output signal. A portion of the light beam of three diffractive components is reflected by the reflection surface 222 of the knife edge 220 to the selected optical disk through a corresponding part of the optical device 230 and the objective lens 240, wherein the corresponding part of the optical device 230 transmits the light beam having the same wavelength as that of the selected light beam and reflects the light beams having wavelengths different from that of the selected light beam. The objective lens 240 focuses the portion of the light beam of three diffractive components transmitted through the optical device 230 on the selected optical disk and converges the portion of the light beam of three diffractive components reflected from the selected optical disk onto the detector 260. The portion of the light beam of three diffractive components reflected from the selected optical disk impinges onto the detector 260 through the objective lens 240 and the corresponding part of the optical device 230.

Figure 3:
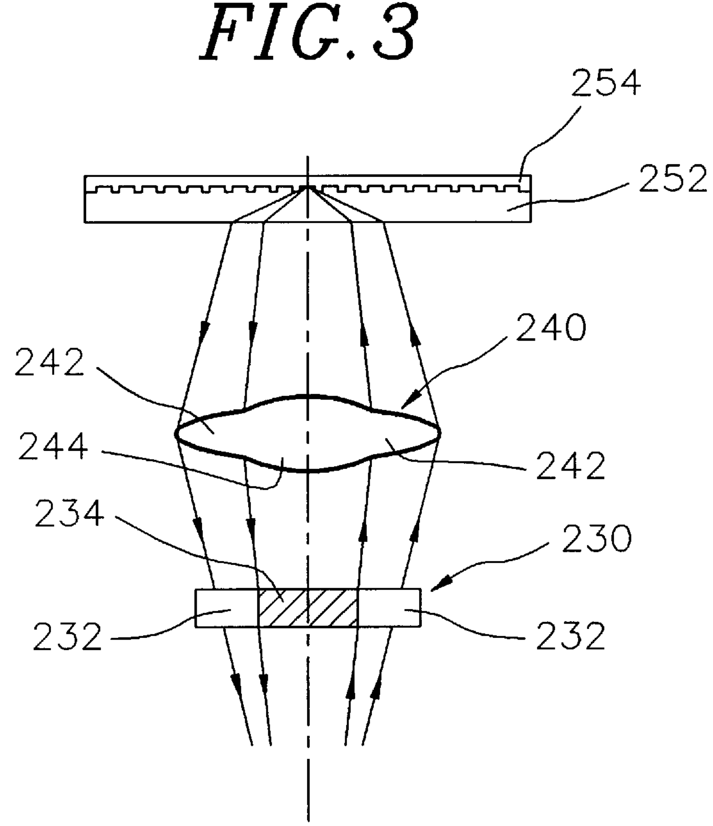
FIG. 3 depicts an enlarged view showing a construction of the optical device and the objective lens shown in FIG. 2, when a thin optical disk is loaded on a disk tray.

In FIG. 3, there is shown an enlarged view of the construction of the optical device 230 and the objective lens 240 shown in FIG. 2, when a thin, e.g., 0.6 mm, optical disk 252 is loaded on the disk tray.

In reproducing an information signal recorded on the recording surface 254 of the thin optical disk 252, the light source 210 generates the first light beam, having the first wavelength $\lambda_1$ shown in FIG. 3, wherein the solid line represents an optical path of the three diffractive components of the first light beam emitted from the light source 210. In this case, the optical device 230 includes a first and a second parts 232, 234, wherein the first part 232 is in the form of an annular disk. The first part 232 transmits the three diffractive components of the first light beam having the first wavelength $\lambda_1$ to the objective lens 240 and reflects the other light beams having different wavelengths. The objective lens 240 includes a first and a second divisions 242, 244, wherein the numerical aperture of the first division 242 is larger than that of the second division 244. Further, the first division 242 of the objective lens 240 is designed for focusing the light beam impinging thereon onto the recording surface 254 of the thin optical disk 252. The three diffractive components of the light beam transmitted through the first part 232 are focused on the recording surface 254 of the optical disk 252 through the first division 242 of the objective lens 240. The first division 242 of the objective lens 240 converges the light beam reflected from the recording surface 254 on the detector 260 by passing by the reflection surface 222 of the knife edge 220.

Figure 4A:
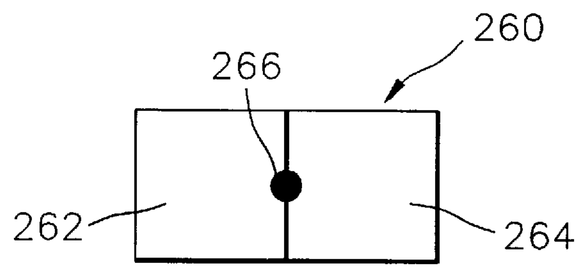
FIGS. 4A to 4C exemplify beam spots impinging onto the reception surface of the detector when the thin optical disk is loaded on a disk tray.
Figure 4B:
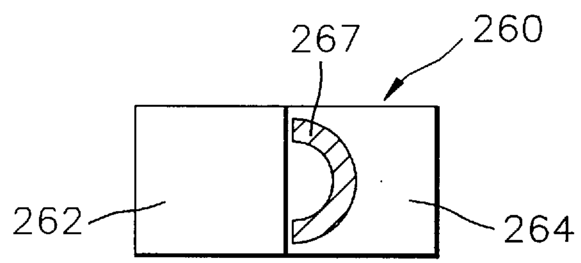
Figure 4C:
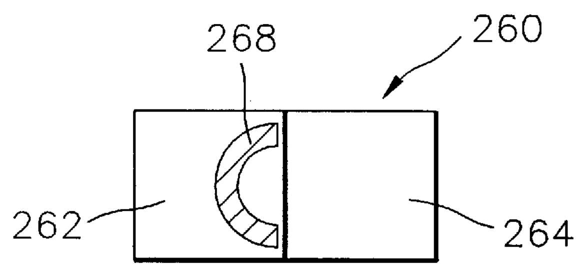

In FIGS. 4A to 4C, there are exemplified beam spots impinging onto the reception surfaces 262, 264 of the detector 260 when the thin optical disk 252 is loaded on the disk tray.

FIG. 4A shows a beam spot 266 created by the three diffractive components of the first light beam impinging on the first and the second reception surfaces 262, 264, respectively, wherein the size of the beam spot 266 represents the intensity of the three diffractive components of the first light beam impinging thereon. The intensity of the three diffractive components impinging onto the first and the second reception surfaces 262, 264 becomes equal to each other when the thin optical disk 252 is placed precisely at a focal position. In such a situation, the outputs from the first and the second reception surfaces 262, 264 become equal to each other, and a signal detection unit(not shown) generates zero as a focusing error signal. If the thin optical disk 252 moves closer toward the objective lens 240, the three diffractive components of the first light beam impinge onto the second reception surface 264, wherein the size of the light beam spot thereon varies with the size of the displacement of the thin optical disk 252, as shown in FIG. 4B, thereby allowing the signal detection unit to generate a negative value as the focusing error signal. When the thin optical disk 252 moves away from the objective lens 240, the first light beam impinges onto the first reception surface 262, as illustrated in FIG. 4C, thereby allowing the signal detection unit to produce a positive value as the focusing error signal.

Figure 5:
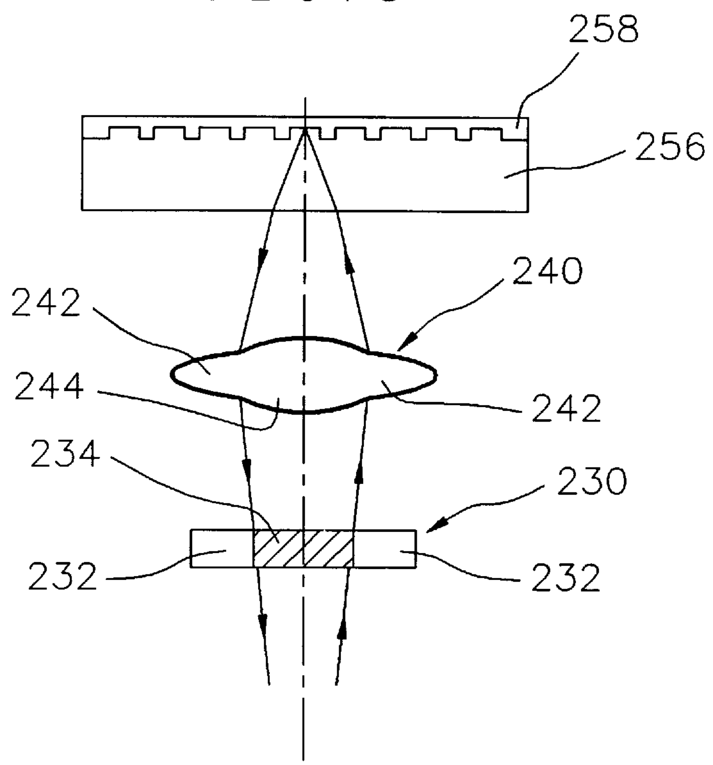
FIG. 5 shows an enlarged view showing the construction of the optical device and the objective lens shown in FIG. 2, when a thick optical disk is loaded on a disk tray.

On the other hand, in reproducing an information signal recorded on the recording surface 258 of the thick, e.g., 1.2 mm, optical disk 256, the light source 210 generates the second light beam, having the second wavelength $\lambda_2$ shown in FIG. 5, wherein the solid line represents an optical path of the three diffractive components of the second light beam emitted from the light source 210. In this case, the second part 234 of the optical device 230 transmits the three diffractive components of the second light beam having the second wavelength $\lambda_2$ to the objective lens 240 and reflects the other light beams having different wavelengths. The light beam transmitted through the second part 234 of the optical device 230 impinges onto the second division 244 of the objective lens 240. Further, the second division 244 of the objective lens 240 is designed to focus the light beam impinging thereon onto the recording surface 258 of the thick optical disk 256. The three diffractive components of the second light beam transmitted through the second part 234 are focused on the recording surface 258 of the thick optical disk 256 by the second division 244 of the objective lens 240. The second division 244 of the objective lens 240 converges the light beam reflected from the recording surface 258 on the detector 260 after being transmitted through the second part 234 of the optical device 230 and bypassing the reflection surface 222 of the knife edge 220.

Figure 6A:
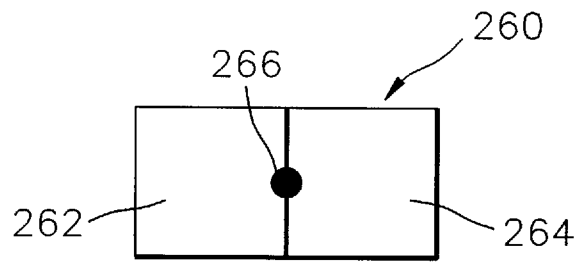
FIGS. 6A to 6C describe beam spots impinging onto the reception surface of the detector when the thick optical disk is loaded on a disk tray.
Figure 6B:
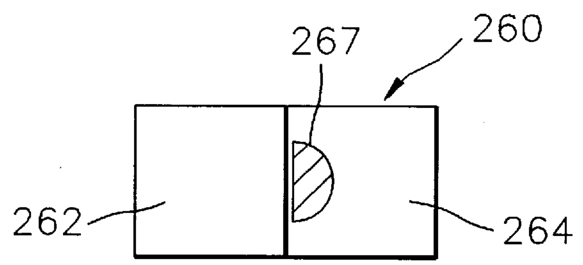
Figure 6C:
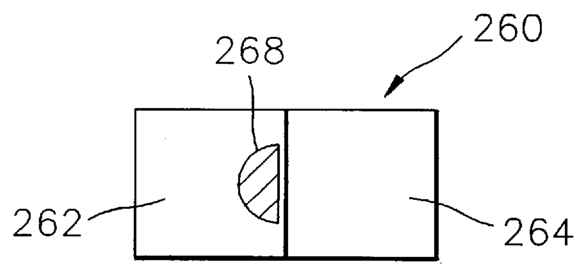

In FIGS. 6A to 6C, there are exemplified beam spots impinging onto the reception surfaces 262, 264 of the detector 260 when the thick optical disk 256 is loaded on the disk tray.

FIG. 6A shows a beam spot 266 created by the three diffractive components of the second light beam impinging on the first and the second reception surfaces 262, 264, respectively, wherein the size of the beam spot 266 indicates the intensity of the three diffractive components of the second light beam impinging thereon. The intensity of the light beam impinging onto the first and the second reception surfaces 262, 264 becomes equal to each other when the thick optical disk 256 is placed precisely at a focal position. In such a situation, the outputs from the first and the second reception surfaces 262, 264 become equal to each other, and the signal detection unit generates zero as a focusing error signal. If the thick optical disk 256 moves closer toward the objective lens 240, the three beam of the second light beam impinges onto the second reception surface 264, wherein the size of a beam spot on the reception surface changes depending on the size of the displacement of the thick optical disk 256, as shown in FIG. 6B, thereby the signal detection unit to generate a negative value as the focusing error signal. When the thick optical disk 256 moves away from the objective lens 240, the second light beam impinges onto the first reception surface 262, as illustrated in FIG. 6C, thereby permitting the signal detection unit to produce a positive value as the focusing error signal.

In addition, detection of tracking errors may be achieved by utilizing a push-pull method.

Even though the present invention has been described for an optical pick system having a light source capable of selectively generating either one of two light beams, each of the light beams having a different wavelength from each other and hence capable of reading information recorded on either one of a thin and a thick optical disks, selectively, the idea presented above can be extended to an optical pickup system for use with a thin and a thick optical disks, by utilizing therein, e.g., a light source capable of selectively generating a P and an S polarizations.

While the present invention has been described with respect to the preferred embodiments, other modifications and variations may be made without departing from the spirit and scope of the present invention as set forth in the following claims.

What is claimed is:

1. An optical pickup system for reading information stored on a first or a second optical disk being selectively loaded on a disk tray, each of the optical disks having a recording surface and a different thickness, the optical pickup system comprising:

a light source for selectively generating a first or a second light beam, each of the light beams having a different wavelength from each other;

means for reflecting a portion of the selectively generated light beam toward the recording surface of the selectively loaded optical disk;

means for transmitting a fraction of the reflected light beam toward the recording surface of the selectively loaded optical disk; and means for focusing the transmitted light beam on the recording surface of the selectively loaded optical disk, thereby allowing for the optical pickup system to read the information off the recording surface.

2. The optical pickup system of claim 1, further comprising a detector, being placed opposite the optical disk with respect to the focusing means, provided with a plurality of reception surfaces, each of the reception surfaces being capable of measuring a light beam intensity and generating a corresponding output signal.

3. The optical pickup system of claim 2, wherein the transmitted light beam is converged onto the detector.

4. The optical pickup system of claim 3, wherein the focusing means includes a first and a second parts capable of focusing the first and the second light beams on the recording surfaces of the first and the second optical disks, respectively.

5. The optical pickup system of claim 4, wherein the transmitting means includes a first and a second parts capable of transmitting the first and the second light beams reflected from the reflecting means, respectively.

6. The optical pickup system of claim 5, wherein the reflecting means is arranged in such a way that it is inclined at a predetermined angle with respect to an optical axis formed by a central point of the detector and the focal point of the focusing means.

7. The optical pickup system of claim 6, wherein the predetermined angle is 45 degrees.

8. The optical pickup system of claim 5, wherein the reflecting means is disposed between the transmitting means and the detector.

9. The optical pickup system of claim 8, wherein the first optical disk is of a thickness of 0.6 mm.

10. The optical pickup system of claim 9, wherein the second optical disk is of a thickness of 1.2 mm.

11. The optical pickup system of claim 10, wherein the first part of the transmitting means is in the form of an annular disk.

12. The optical pickup system of claim 10, wherein the numerical aperture of the first part is larger than that of the second part of the transmitting means.

13. The optical pickup system of claim 1, further comprising a diffraction grating for generating a three component beam.

14. The optical pickup system of claim 13, wherein the diffraction grating is disposed between the light source and the reflecting means.

15. The optical pickup system of the claim 14, wherein a tracking error signal is detected by applying a push-pull method.

16. An optical pickup system for reading information stored on a first or a second optical disk which has been selectively loaded on a disk tray, each of the optical disks having a recording surface and a different thickness, the optical pickup system comprising:

a light source for selectively generating a first light beam having a first wavelength or a second light beam having a second wavelength, said first and second wavelengths being different from each other;

a reflector arranged to reflect at least a portion of the selectively generated light beam toward the recording surface of the selectively loaded optical disk;

an optical device, positioned between said reflector and the selectively loaded optical disk and arranged to transmit light reflected by said reflector toward said selectively loaded optical disk, said optical device comprising a first part which transmits light of said first wavelength and a second part which transmits light of said second wavelength; and a lens, positioned between said optical device and the selectively loaded optical disk and arranged to focus the transmitted light onto the recording surface of the selectively loaded optical disk, thereby allowing for the optical pickup system to read the information off the recording surface of the selectively loaded optical disk, said lens comprising a first part which focuses light of said first wavelength and a second part which focuses light of said second wavelength.

17. The optical pickup system of claim 16, further comprising a diffraction grating positioned between said light source and said reflector.

18. The optical pickup system of claim 17, further comprising a detector placed opposite the optical disk with respect to the lens, said detector being provided with a plurality of reception surfaces.

19. The optical pickup system of claim 16, wherein the first part of the optical device is in the form of an annular disk.

20. The optical pickup system of claim 16, wherein a numerical aperture of the first part of the optical device is greater than a numerical aperture of the second part of the optical device.

* * * * *